US012519157B2

(12) United States Patent
Belardo et al.

(10) Patent No.: US 12,519,157 B2
(45) Date of Patent: Jan. 6, 2026

(54) HOUSING FOR A TRACTION BATTERY

(71) Applicant: Mahle International GmbH, Stuttgart (DE)

(72) Inventors: Davide Belardo, Vaihingen/Enz (DE); Ingo Haeusler, Esslingen (DE); Dierk Hoffmann, Leonberg (DE); Stefan Kaiser, Remseck (DE); Ruediger Knauss, Kernen i.R. (DE); Michael Mundorff, Ostfildern (DE); Nico Storz, Reichenbach (DE)

(73) Assignee: Mahle International GmbH (DE)

(*) Notice: Subject to any disclaimer, the term of this patent is extended or adjusted under 35 U.S.C. 154(b) by 617 days.

(21) Appl. No.: 17/901,834

(22) Filed: Sep. 1, 2022

(65) Prior Publication Data

US 2023/0073289 A1   Mar. 9, 2023

(30) Foreign Application Priority Data

Sep. 3, 2021 (DE) ..................... 10 2021 209 746.4

(51) Int. Cl.
*H01M 10/6568* (2014.01)
*H01M 10/613* (2014.01)
*H01M 10/625* (2014.01)
*H01M 50/209* (2021.01)
*H01M 50/262* (2021.01)

(52) U.S. Cl.
CPC ..... *H01M 10/6568* (2015.04); *H01M 10/613* (2015.04); *H01M 10/625* (2015.04); *H01M 50/209* (2021.01); *H01M 50/262* (2021.01); *H01M 2220/20* (2013.01)

(58) Field of Classification Search
None
See application file for complete search history.

(56) References Cited

U.S. PATENT DOCUMENTS

| 2010/0297486 | A1 | 11/2010 | Fujii |
| 2020/0079241 | A1 | 3/2020 | Haeusler |
| 2020/0411816 | A1* | 12/2020 | Yoneyama .......... H01M 10/613 |
| 2022/0416343 | A1* | 12/2022 | He ..................... H01M 50/218 |

FOREIGN PATENT DOCUMENTS

| DE | 102010020876 A1 | 11/2010 |
| DE | 102019213424 A1 | 3/2020 |

OTHER PUBLICATIONS

German Search Report for DE-10 2021 209 746.4, dated Mar. 9, 2022.

* cited by examiner

*Primary Examiner* — Ryan S Cannon
*Assistant Examiner* — Karen J. Armstrong
(74) *Attorney, Agent, or Firm* — Fishman Stewart PLLC

(57) ABSTRACT

A housing for a traction battery of a hybrid or electric vehicle may include at least two housing parts and at least one coolant tube. The at least two housing parts may include a first housing part and a second housing part, which are separate from one another. Each of the housing parts may include a bottom and a plurality of side walls perpendicularly projecting from the bottom. The at least one coolant tube may be arranged between a first side wall of the first housing part and a second side wall of the second housing part. The at least two housing parts may each be glued to the at least one coolant tube via a respective adhesive layer of a plurality of adhesive layers such that the at least two housing parts are connected to one another via the at least one coolant tube.

13 Claims, 3 Drawing Sheets

HOUSING FOR A TRACTION BATTERY

CROSS-REFERENCE TO RELATED APPLICATIONS

This application claims priority to German Patent Application No. DE 10 2021 209 746.4, filed on Sep. 3, 2021, the contents of which is hereby incorporated by reference in its entirety.

TECHNICAL FIELD

The invention relates to a housing for a traction battery of a hybrid or electric vehicle.

BACKGROUND

A traction battery is known for example from DE 10 2019 213424 A1. The traction battery usually includes a metallic housing and multiple battery modules arranged in the housing. The housing usually comprises a housing tub receiving the battery modules and a housing cover closing the housing tub. The housing tub can be in one piece or multiple pieces. The one-piece housing tub can only be produced with a major effort in terms of technical equipment and the size of the housing tub is limited. In the multi-part housing tub, multiple individual parts are joined to form the housing tub. Here, the individual parts can be welded or riveted or screwed to one another. Because of this, the production of the housing tub includes multiple individual steps and is very expensive.

SUMMARY

The object of the invention therefore is to state for a housing of the generic type an improved or at least alternative embodiment with which the described disadvantages are overcome.

According to the invention, this object is solved through the subject matter of the independent claim(s). Advantageous embodiments are the subject matter of the dependent claim(s).

A housing is provided for a traction battery of a hybrid or electric vehicle. The housing comprises at least two housing parts that are separate from one another and at least one separate coolant tube. The respective housing part can be designed as a housing tub. The respective housing part, in particular in the form of a housing tub, comprises a bottom and multiple side walls perpendicularly projecting from the bottom. The at least one coolant tube is arranged between the side walls of the two adjacent housing parts. According to the invention, the respective housing parts are glued to the coolant tube arranged in between by means of an adhesive layer each and the respective housing parts are thus firmly connected to one another via the coolant tube. Advantageously, the housing can be formed from plastic.

The respective housing part, in particular in the form of a housing tub, is arranged facing the coolant tube with one of the side walls. The coolant tube can extend over an entire length of the side wall of the respective housing part facing the coolant tube. Advantageously, the coolant tube can also extend over an entire height of the side wall of the respective housing part facing the coolant tube. The respective housing can comprise for example a rectangular bottom and four side walls each located opposite one another in pairs. The coolant tube can additionally be glued to the respective facing side wall over the entire length and/or over the entire height of the same. Because of this, a secure mechanical connection between the coolant tube and the respective adjacent housing part can be achieved. In addition, the housing can thus be produced more simply.

Advantageously, the respective coolant tube can comprise multiple tube segments, wherein the tube segments are firmly connected to one another in a fluid-tight manner. Preferentially, the multiple tube segments are integrally bonded to one another. Here, the multiple tube segments can have an inner cross-section differing from one another. In the respective coolant tube, an inflow channel for the inflow of the coolant and an outflow channel for the outflow of the coolant can be additionally formed. The inflow channel and the outflow channel can each have different cross-sections in the respective tube segments. In particular, the cross-section of the inflow channel can decrease in consecutive tube segments in the flow direction and the cross-section of the outflow channel can increase in consecutive tube segments in the flow direction.

In an advantageous embodiment it can be provided that in the housing at least one coolant inlet and/or one coolant outlet is formed. The respective coolant inlet can fluidically lead out of the coolant tube into one of the respective adjacent housing parts and the at least one coolant outlet can fluidically lead out of one of the housing parts into the respective adjacent coolant tube. In the coolant tube, an inflow channel and an outflow channel can be formed, wherein the coolant inlet fluidically leads into the inflow channel and the coolant outlet fluidically leads into the outflow channel. Practically, within the coolant tube, the inflow channel and the outflow channel are fluidically separated from one another. For sealing the housing it can be provided that the respective adhesive layer encircles the at least one coolant inlet and/or the at least one coolant outlet, sealing the same towards the outside.

The respective adhesive layer can be formed from a structural adhesive for a self-supporting structural bond. Here, a structural adhesive is to mean adhesives which in the cured state contribute to solidifying the components glued to one another for a long period of time and also maintain the strength. Furthermore, these adhesives are highly resistant to chemical and physical influences. Such adhesives are in particular reaction adhesives such as for example phenol resins, epoxy resins, polyamide or polyurethane which are preferentially warm-cured. The structural adhesive makes possible a secure and firm mechanical connection of the respective coolant tube with the two adjacent housing parts.

The respective adhesive layer can advantageously have a constant thickness. The thickness of the adhesive layer can preferably be greater than 0.5 mm and particularly preferably greater than 2 mm. Because of this, the adhesive layer can dampen or offset stresses caused through mechanical loads/vibrations and the heat expansion. Preferentially however the adhesive layer is not thicker than 7 mm, in particular not thicker than 5 mm in order to avoid causing defects during the curing, such as for example a crack formation.

In an advantageous embodiment of the housing, the coolant tube can be firmly and positively bonded to one of the adjacent housing parts and/or the coolant tube to the adjacent housing parts and/or the respective adjacent housing parts to one another each in at least one connecting point. Accordingly, the coolant tube can be screwed or riveted to one of the adjacent housing parts and/or the coolant tube to the adjacent housing parts and/or the respective adjacent housing parts to one another. For the screwing, in particular self-tapping screws can be used. The additional mechanical connection can additionally reinforce the bond. In addition, the respective coolant tube and the respective housing parts can be fixed to one another during the adhesive so that the production of the traction battery can be continued even with the adhesive layer not fully cured yet. Advantageously, the adhesive layer can circulate about the respective connecting point and seal the respective connecting point towards the outside.

Advantageously, the housing can comprise at least one housing cover and the at least one housing cover close at least one of the housing parts. In an intermediate space formed between the respective housing cover and the respective housing part, in particular in the form of a housing tub, at least one battery module or multiple battery storage cells can be arranged. The at least one housing cover can be firmly connected with the at least one coolant tube and/or with at least one of the housing parts. Preferentially, the respective housing cover is screwed to the respective coolant tube and/or to at least one of the housing parts. It is conceivable that the housing comprises at least two housing covers wherein a separate housing cover is assigned to each housing part. By way of the housing cover, the respective housing part can be additionally stiffened.

Additionally, the side wall of the respective housing part adjacent to the coolant tube can comprise a flange which is oriented parallel to the bottom of the housing part and facing the coolant tube. The flange can be supported on the coolant tube and clamped between the coolant tube and the housing cover. The housing cover can then be firmly connected to the coolant tube through the flange of the side wall. Preferentially, the housing cover is screwed to the coolant tube. Because of this, the connection between the coolant tube and the housing parts can be additionally secured and reinforced.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
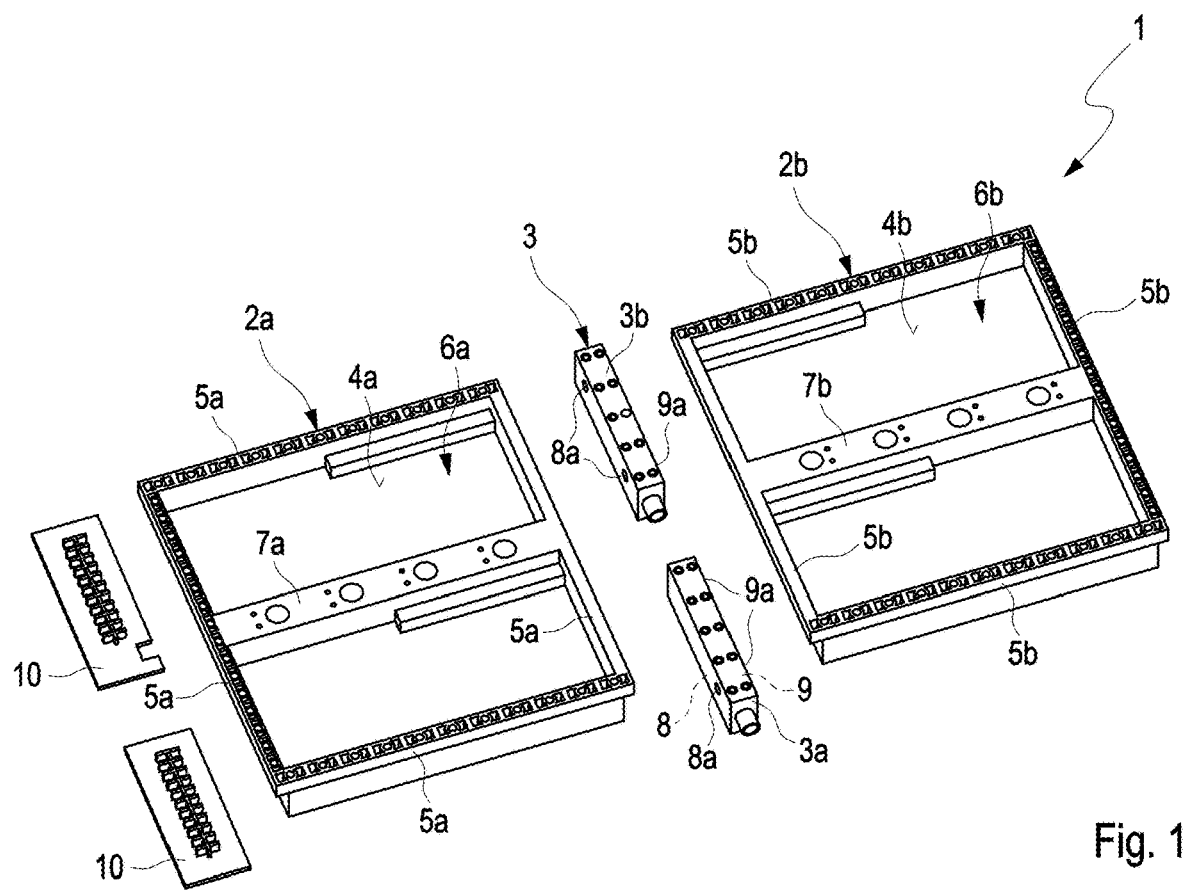
FIG. 1 shows a view of a housing according to the invention without a housing cover.

FIG. 1 shows a view of a housing 1 according to the invention for a traction battery of a hybrid or electric vehicle. Here, the housing 1 comprises two housing parts 2a and 2b separate from one another and a separate cooling tube 3. The respective housing part 2a and 2b respectively is designed in the form of a housing tub. The respective housing part 2a and 2b comprises a bottom 4a and 4b and four side walls 5a and 5b respectively, which perpendicularly project from the bottom 4a and 4b respectively and surround the bottom 4a and 4b respectively on the edge side. The side walls 5a and 5b respectively and the bottom 4a and 4b respectively jointly form an interior space 6a and 6b respectively in which multiple battery modules of the traction battery can be received. Here, the respective interior space 6a and 6b respectively is partitioned by a transverse wall 7a and 7b respectively.

The coolant tube 3 is arranged between the two housing parts 2a and 2b and firmly connected to these. For this purpose, the coolant tube 3 is glued and screwed to the two facing side walls 5a and 5b of the respective housing parts 2a and 2b respectively as will be explained in more detail in the following. In the coolant tube 3, an inflow channel 8 for the housing part 2a and an inflow channel 9 for the housing part 2b and in the housing part 2a of the housing 1 coolant inlets 8a as well in the housing part 2b of the housing 1 coolant inlets 9a are additionally formed. The coolant inlets 8a fluidically connect the housing part 2a with the inflow channel 8 of the coolant tube 3 and the coolant inlets 9a fluidically connect the housing part 2b with the inflow channel 9 of the coolant tube 3. Between the housing part 2a and a cover 10 as well as between the housing part 2b and a further cover 10, outflow channels are additionally formed. In the housing part 2a and in the housing part 2b, coolant outlets are practically provided, which lead into the respective outflow channel. Basically, one of the or both inflow channels 8 and 9 can realise the outflow channels. Then, one of the or both outflow channels can accordingly form the inflow channels 8 and 9.

Further, the coolant tube 3 comprises two tube segments 3a and 3b which are connected to one another in an integrally bonded manner. Here, the cross-section of the inflow channel 8 and of the inflow channel 9 in the two tube segments 3a and 3b of the coolant tube 3 differ from one another in order to make possible conducting the coolant through the coolant tube 3 without pressure loss.

In FIG. 1, two covers 10 are additionally shown which close the cooling channels in the housing part 2a.

Figure 2:
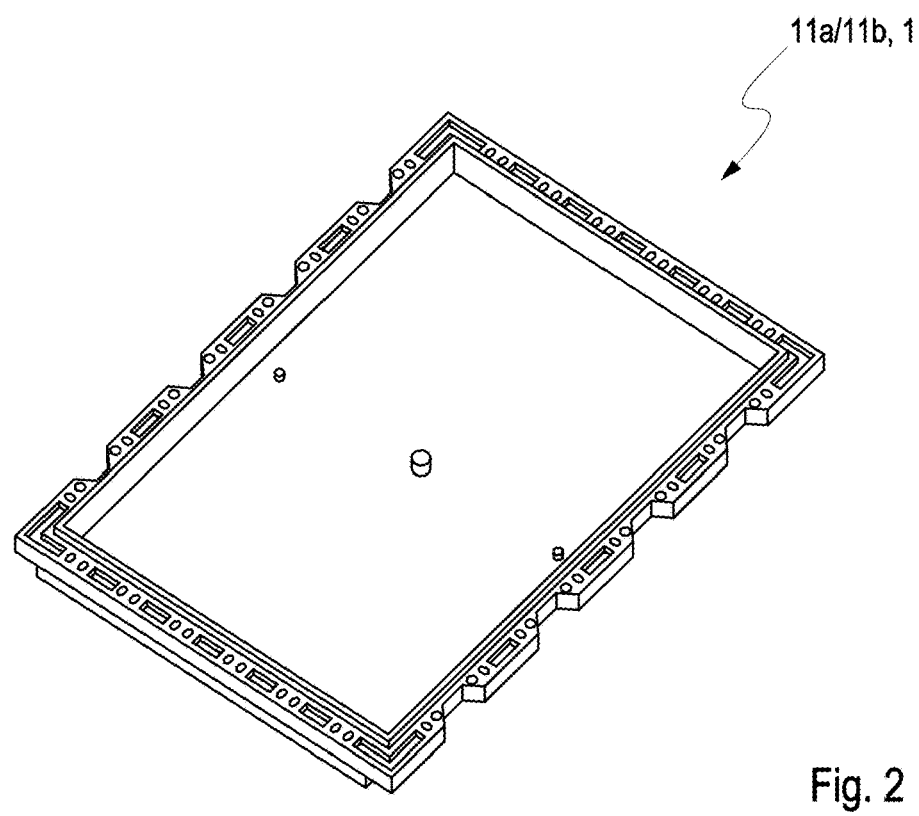
FIG. 2 shows a view of the housing cover of the housing according to the invention.

FIG. 2 shows a view of a housing cover 11a and 11b respectively of the housing 1 according to the invention. In the housing 1, two identical housing covers 11a and 11b are provided, wherein only one is shown here. The respective housing cover 11a and 11b respectively closes the respective housing part 2a and 2b respectively and is screwed to the respective housing part 2a and 2b respectively and the coolant tube 3, as will be explained in more detail in the following.

Figure 3:
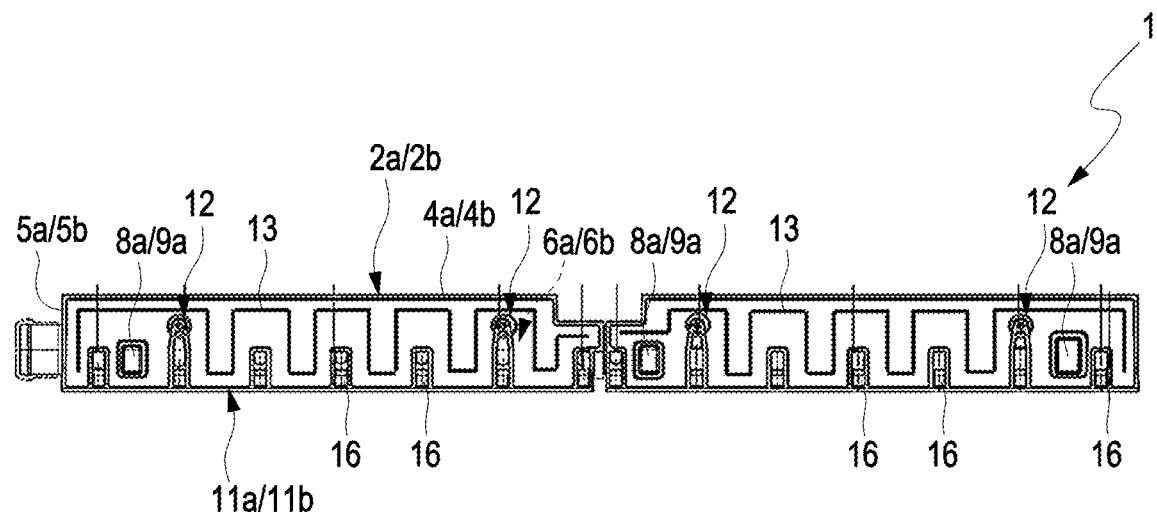
FIGS. 3 and 4 show a sectional view and an enlarged sectional view of a cooling tube of the housing according to the invention.
Figure 4:
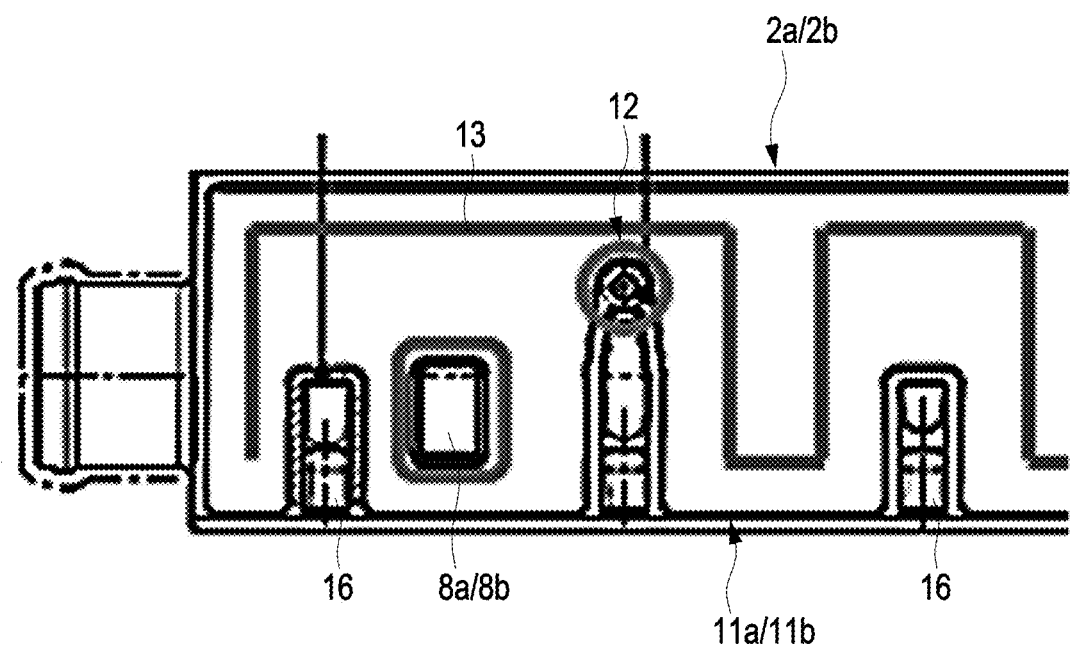

FIG. 3 shows a sectional view and FIG. 4 shows an enlarged sectional view of the cooling tube 3 of the housing 1 according to the invention. In FIG. 3 and FIG. 4, the section plane lies between the housing part 2a and 2b respectively and the coolant tube 3. The coolant tube 3 is screwed at connecting points 12 to the respective housing part 2a and 2b. In additional, the coolant tube 3 is glued to the respective housing part 2a and 2b by way of an adhesive layer 13 of a structural adhesive. The adhesive layer 13 connects the coolant tube 3 to the respective housing part 2a and 2b respectively and additionally seals the connecting points 12 and the coolant inlets 8a and the coolant inlets 9a respectively towards the outside.

Figure 5:
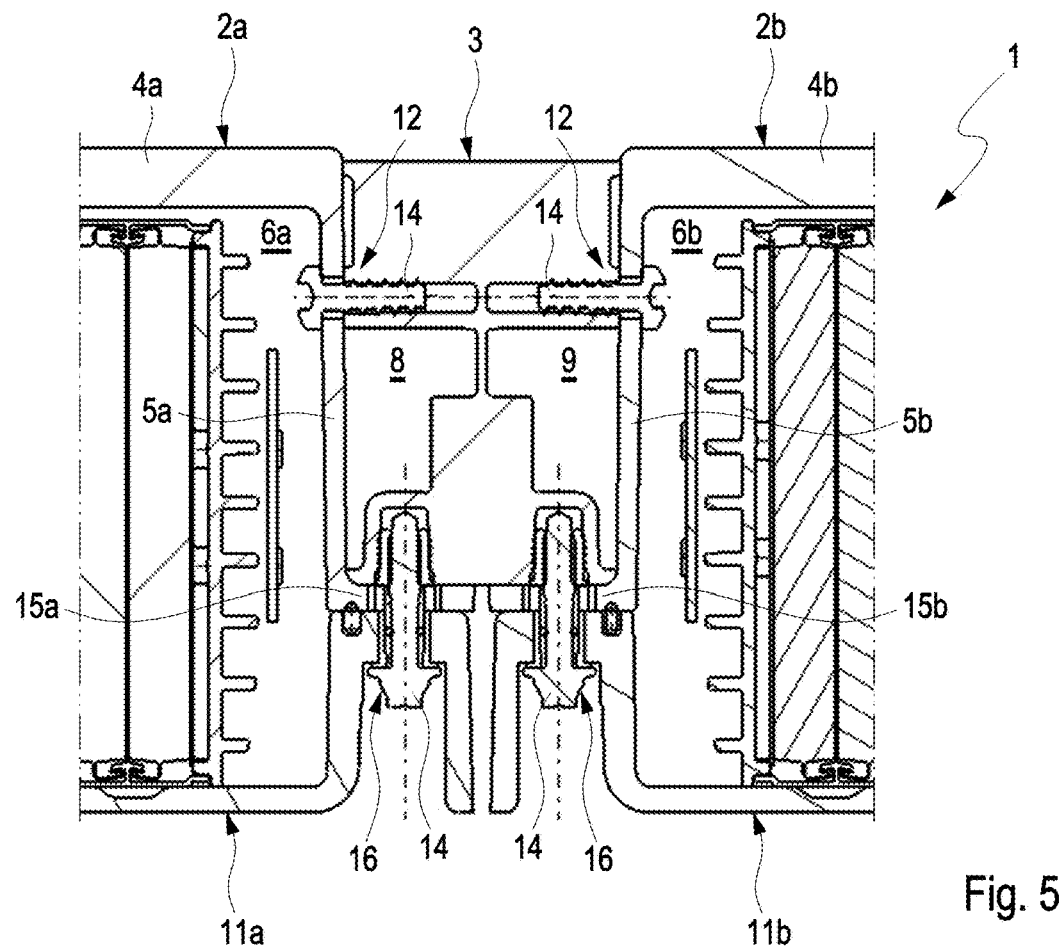
FIG. 5 shows a sectional view of the housing according to the invention at a connecting point.

FIG. 5 shows a sectional view of the housing 1 according to the invention at the connecting point 12. As is particularly clearly noticeable here, the coolant tube 3 is screwed at the respective connecting point 12 to the respective housing part 2a and 2b respectively by means of self-tapping screws 14. In addition, the side wall 5a and 5b respectively of the respective housing part 2a and 2b respectively facing the coolant tube 3 each comprise a flange 15a and 15b respectively. The respective flange 15a and 15b respectively is supported on the coolant tube 3 and is arranged between the coolant tube 3 and the respective housing cover 11a and 11b respectively.

The respective housing cover 11a and 11b respectively closes the respective housing part 2a and 2b respectively and is screwed at cover connecting points 16 to the coolant tube 3 in each case via a self-tapping screw 14. Here, the respective flange 15a and 15b respectively is clamped between the respective housing cover 11a and 11b respectively and the coolant tube 3. In FIG. 5, the inflow channel 8 and the inflow channel 9 are additionally noticeable which in the coolant tube 3 are oriented parallel to one another. Here, the inflow channel 8 is arranged facing the housing part 2a and the inflow channel 9 facing the housing part 2b.

Figure 6:
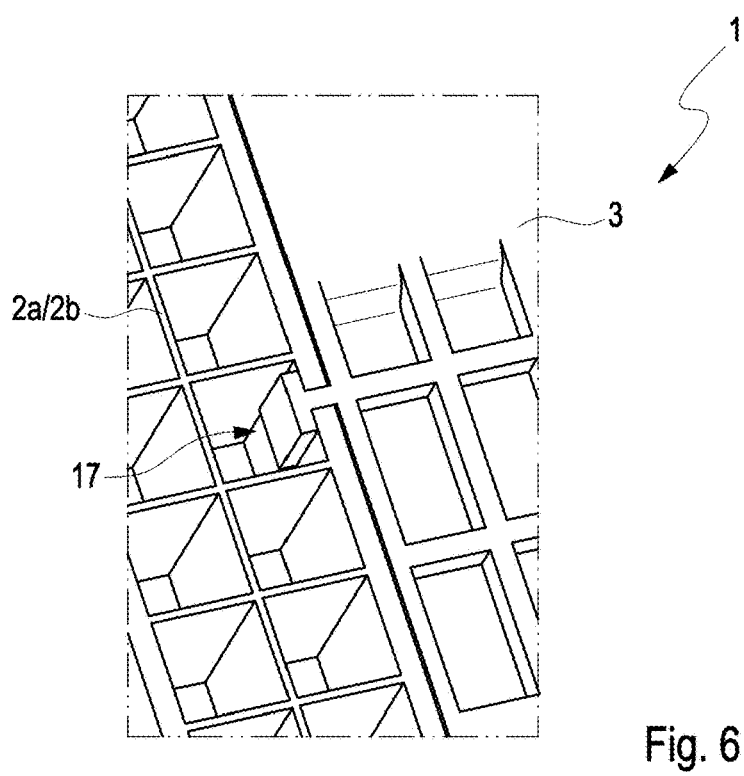
FIG. 6 shows a view of a positive-locking point in the housing according to the invention.

FIG. 6 shows a view of a positive connection point 17 in the housing 1 according to the invention. At the positive connection point 17, the coolant tube 3 and the respective housing part 2a and 2b respectively are connected to one another in a positive-locking manner. The positive connection points 17 can be used in the housing 1 alternatively or additionally to the connecting points 12.

The invention claimed is:

1. A housing for a traction battery of a hybrid or electric vehicle, comprising:
   at least two housing parts that are separate from one another, the at least two housing parts including a first housing part and a second housing part;
   at least one housing cover closing at least one of the at least two housing parts;
   at least one separate coolant tube;
   each of the at least two housing parts including a bottom and a plurality of side walls perpendicularly projecting from the bottom;
   the at least one coolant tube arranged between a first side wall of the plurality of side walls of the first housing part and a second side wall of the plurality of side walls of the second housing part;
   wherein the at least two housing parts are each glued to the at least one coolant tube via a respective adhesive layer of a plurality of adhesive layers such that the at least two housing parts are connected to one another via the at least one coolant tube;
   wherein the first side wall includes a first coolant opening via which the first housing part and the at least one coolant tube are in fluid communication;
   wherein the second side wall includes a second coolant opening via which the second housing part and the at least one coolant tube are in fluid communication;
   wherein a first adhesive layer of the plurality of adhesive layers encircles the first coolant opening and seals the first coolant opening towards an outside;
   wherein a second adhesive layer of the plurality of adhesive layers encircles the second coolant opening and seals the second coolant opening towards an outside;
   wherein the at least one housing cover is connected to at least one of the at least one coolant tube and at least one of the at least two housing parts;
   wherein at least one of the first side wall and the second side wall includes a flange projecting therefrom parallel to the bottom and facing the at least one coolant tube;
   wherein the flange is supported on the at least one coolant tube and clamped between the at least one coolant tube and the at least one housing cover; and
   wherein the at least one housing cover is connected to the at least one coolant tube via a screw that extends through the flange.

2. The housing according to claim 1, wherein:
   the at least one coolant tube includes a plurality of tube segments; and
   the plurality of tube segments are connected to one another in a fluid-tight manner.

3. The housing according to claim 1, wherein the first coolant opening and/or the second cooling opening defines a coolant inlet.

4. The housing according to claim 1, wherein:
   the at least two housing parts are connected to one another in a positive-locking manner at at least one connecting point; and
   an adhesive layer of the plurality of adhesive layers encircles the at least one connecting point and seals the at least one connecting point towards an outside.

5. The housing according to claim 1, wherein the first coolant opening and/or the second cooling opening defines a coolant outlet.

6. The housing according to claim 1, wherein at least one of the plurality of adhesive layers has a constant thickness of 2 mm to 5 mm.

7. The housing according to claim 1, wherein the at least one coolant tube is connected in a positive-locking manner to at least one of (i) the first housing part at a first connecting point and (ii) the second housing part at a second connecting point.

8. The housing according to claim 7, wherein at least one of:
   one of the plurality of adhesive layers encircles the first connecting point and seals the first connecting point to an outside; and
   one of the plurality of adhesive layers encircles the second connecting point and seals the second connecting point to an outside.

9. The housing according to claim 2, wherein the plurality of tube segments are integrally bonded to one another.

10. The housing according to claim 1, wherein the at least one housing cover includes:
    a first housing cover closing the first housing part; and
    a separate second housing cover closing the second housing part.

11. The housing according to claim 1, wherein the at least one coolant tube includes:
    a first flow channel in fluid communication with the first housing part via the first coolant opening of the first side wall; and
    a second flow channel in fluid communication with the second housing part via the second coolant opening of the second side wall.

12. The housing according to claim 11, wherein the at least one coolant tube includes a partition wall disposed between and separating the first flow channel and the second flow channel.

13. A housing for a traction battery of a hybrid or electric vehicle, comprising:
    a first tub-shaped housing part defining a first housing part interior space configured to receive at least one first battery module, the first housing part including a first side wall having a first coolant inlet and a first coolant outlet;

a second tub-shaped housing part defining a second housing part interior space configured to receive at least one second battery module, the second housing part including a second side wall having a second coolant inlet and a second coolant outlet;

a first housing cover closing the first housing part;

a second housing cover closing the second housing part;

at least one coolant tube arranged between the first side wall and the second side wall;

the at least one coolant tube including an inflow channel in fluid communication with the first housing part via the first coolant inlet and in fluid communication with the second housing part via the second coolant inlet;

the at least one coolant tube further including an outflow channel in fluid communication with the first housing part via the first coolant outlet and in fluid communication with the second housing part via the second coolant outlet; and a plurality of adhesive layers including a first adhesive layer and a second adhesive layer;

wherein the first adhesive layer connects the first side wall and the at least one coolant tube to one another, encircles and seals the first coolant inlet, and encircles and seals the first coolant outlet;

wherein the second adhesive layer connects the second side wall and the at least one coolant tube to one another, encircles and seals the second coolant inlet, and encircles and seals the second coolant outlet;

wherein the first side wall includes a first flange supported on the at least one coolant tube;

wherein the second side wall includes a second flange supported on the at least one coolant tube;

wherein the first housing cover is connected to the first flange and to the at least one coolant tube via a first screw;

wherein the second housing cover is connected to the second flange and to the at least one coolant tube via a second screw;

wherein the first flange includes a first flange through-hole, the first housing cover includes a first cover through-hole that is axially aligned with the first flange through-hole, and the first screw extends through the first flange through-hole and the first cover through-hole and engages the at least one coolant tube; and wherein the second flange includes a second flange through-hole, the second housing cover includes a second cover through-hole that is axially aligned with the second flange through-hole, and the second screw extends through the second flange through-hole and the second cover through-hole and engages the at least one coolant tube.

* * * * *